United States Patent
Whitfield et al.

(10) Patent No.: US 9,293,977 B2
(45) Date of Patent: Mar. 22, 2016

(54) INHERENTLY TORQUE LIMITING MAGNETICALLY-COUPLED WHEELS

(76) Inventors: George Winston Whitfield, St. Mary (JM); Howard Martin Chin, Kingston (JM)

(*) Notice: Subject to any disclaimer, the term of this patent is extended or adjusted under 35 U.S.C. 154(b) by 379 days.

(21) Appl. No.: 13/066,927

(22) Filed: Apr. 28, 2011

(65) Prior Publication Data

US 2011/0266902 A1 Nov. 3, 2011

Related U.S. Application Data

(60) Provisional application No. 61/343,395, filed on Apr. 28, 2010.

(51) Int. Cl.
| | | |
|---|---|---|
| *H02K 49/10* | (2006.01) | |
| *B63H 23/22* | (2006.01) | |
| *B64D 27/24* | (2006.01) | |
| *B64D 35/02* | (2006.01) | |

(52) U.S. Cl.
CPC .............. *H02K 49/102* (2013.01); *B63H 23/22* (2013.01); *B64D 27/24* (2013.01); *B64D 35/02* (2013.01); *Y02T 50/62* (2013.01)

(58) Field of Classification Search
CPC ..... F16H 49/005; F16H 1/006; H02K 49/102; H02K 49/104; H02K 49/106; H02K 49/108; H02K 49/10
USPC ............... 310/103; 74/DIG. 4, 380, 384, 385; 475/216; 433/133; 476/40, 41, 42
See application file for complete search history.

(56) References Cited

U.S. PATENT DOCUMENTS

| 7,105,968 | B2 * | 9/2006 | Nissen ........................... 310/103 |
| 8,403,916 | B2 * | 3/2013 | Prescott ............................ 606/1 |
| 2006/0091748 | A1 * | 5/2006 | Yoda et al. ....................... 310/83 |

FOREIGN PATENT DOCUMENTS

| JP | 57134066 A | * | 8/1982 | ............. F16H 49/00 |
| JP | 60014655 A | * | 1/1985 | ............. F16H 49/00 |
| JP | 61077595 A | * | 4/1986 | ............. B63H 23/24 |
| JP | 09056146 A | * | 2/1997 | ............. H02K 49/10 |
| JP | 09257116 A | * | 9/1997 | ............. F16H 49/00 |
| JP | 2005207564 A | * | 8/2005 | ............. F16H 49/00 |
| WO | WO 9622630 A1 | * | 7/1996 | ............. H02K 49/06 |

OTHER PUBLICATIONS

Mizutari, JP2005207564 Machine Translation, Aug. 2005.*

* cited by examiner

*Primary Examiner* — Quyen Leung
*Assistant Examiner* — Eric Johnson
(74) *Attorney, Agent, or Firm* — D. Peter Hochberg; Sean F. Mellino

(57) ABSTRACT

An apparatus having at least one rotatable driven object having an edge on which are disposed a series of adjacent magnets of alternating polarity and a driving object rotatable by an external motor torque and having a series of adjacent magnets of alternating polarity on a magnet supporting surface. The magnet supporting surface of the driving object is rotatable through a common region approximately centered about the point of closest approach to the magnet supporting edge of the driven object for sequentially placing magnets of the driving object in the region enveloping the effective interactive range between the two objects. The fields of magnets of opposite polarity of the driving object interact with the fields of the magnets on the driving object to effect rotation of the driven object. Disclosed are structures for torque limiting wheels, magnetic gear trains, reduction gears and ball joints, and propulsion systems for watercraft and aircraft.

5 Claims, 10 Drawing Sheets

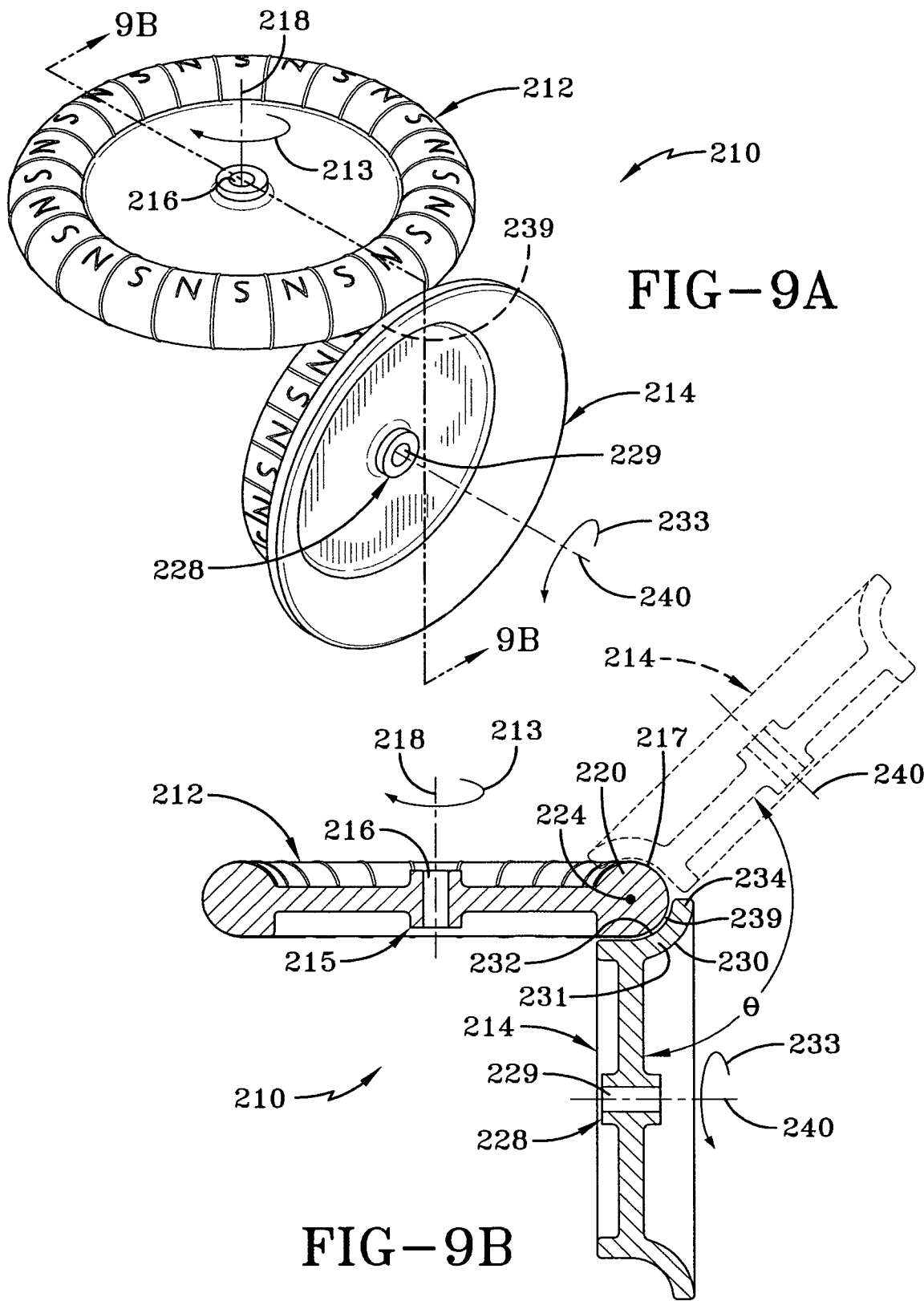

INHERENTLY TORQUE LIMITING MAGNETICALLY-COUPLED WHEELS

CROSS-REFERENCE TO RELATED APPLICATION

This application claims priority of U.S. Provisional Application No. 61/343,395 filed Apr. 28, 2010, under Title 35, United States Code, Section 119(e), which is incorporated herein by reference in its entirety.

BACKGROUND OF THE INVENTION

1. Field of the Invention

This invention relates to magnetically coupled wheels (sometimes referred to as magnetic gears) and rotating objects, and in particular to a magnetically driven set of wheels or rotating objects which are not to be physically engaged by the respective driving wheels or driving objects and can operate at a spaced distance from the respective driving wheels or driving objects, as well as operating other components operated by the driven wheels or driven rotating objects.

2. Description of the Prior Art

Many devices function by having at least one rotating member for engagement with another member. The problem with such physical contact is that there is often the problem of jamming of the parts, the problem of deleterious particles and matter getting between the parts, loss of lubrication and the wearing down by friction. These known devices include geared transmissions and gearboxes containing gears. Propulsion systems are well known for extending through a hull or other wall, which require complex and expensive seals and stuffing boxes. Such systems sometimes utilize noxious fluids including lubricants and gases. Other such systems are not useable in dusty and gritty environments where the atmosphere contains deleterious components. There are also situations where angles of rotation of a pair of shafts with respect to each other must change during rotation of the shafts, where a relatively simple arrangement without a complex gearing structure would be most advantageous.

SUMMARY OF THE INVENTION

It is an object of the present invention to provide apparatus for rotating one member by another member without requiring physical engagement of the two members.

Another object of the invention is to provide apparatus for rotating a pair of devices without any frictional loss between the devices or any interim devices connecting the pair of devices except in the shaft bearings and with insignificant hysteresis losses.

Another object is to provide for the relative rotation of a pair of devices without appreciable friction.

A still further object of the present invention is to provide apparatus for transferring the speed and torque from one rotating member to another rotating member without the use of toothed gears or physically contacting parts.

It is also an object of the present invention to provide apparatus for changing the direction of rotation of a set of rotating members without the use of toothed gears.

An additional object is to provide a gear train without the use of toothed gears.

It is yet another object to provide propulsion systems in marine or other applications where the driven and driving components are on opposite sides of a hull or other wall structure, where the driven and driving components interact without requiring an opening in the hull or other wall structure.

A yet additional object of the present invention is to provide apparatus for changing the orientation of rotating shafts during the rotation of the shafts.

Another object of the present invention is to provide a device for replacing a mechanical gear train.

It is still another object to effect the rotation of a driven object by another driving object without requiring the physical engagement of the objects and without necessarily requiring motion of the driving object.

It is also a further object of the present invention to provide for the rotation of a driven member by a driving member which does not require the use of noxious or deleterious fluids for lubrication.

Additionally it is an object to provide a system having a driven rotating wheel rotated by a driving wheel which limits the torque between driving and driven wheels.

A further object is the provision of a driving wheel for driving a driven wheel where performance is not affected by the presence of water, dust and grit in the environment where the driving and driven wheels are operating.

It is a further object of the present invention to provide a propulsion system for craft which does not require physical engagement between the driving and driven components.

These and other objects may occur to those skilled in the art from the description to follow and from the appended claims.

A preferred embodiment of the invention, which is incorporated in other embodiments of the invention, comprises a driving rotational object having magnet supporting surface which supports a series of adjacent magnets of opposite polarity, the driving rotational component being adjacent to at least one driven rotational object and having a magnet supporting edge including a set of adjacent magnets having opposite polarities. An external motor torque rotates the driving rotational object. The driving rotational object passes its magnets through a first location and the driven object passes its magnets through a second location spaced from the first location, but the first and second locations are within a common region where the magnetic fields of those of the respective magnets of the driving rotational object and the driven rotational object in the respective first and second locations are strong enough to have an appreciable physical effect on the other rotational object, wherein magnets of one polarity on the driving rotational object in the first location attract magnets of unlike polarity on the driven rotational object in the second location to effect the rotation of the driven rotational object. The term "appreciable physical effect on the other rotational object" means that the magnets on one object have enough effect on the magnets of the other object to effect the rotation of the other object.

BRIEF DESCRIPTION OF THE DRAWINGS

FIGS. 9A and 9B show another gear train according to still a further preferred embodiment of the invention, with FIG. 9A being a perspective view and FIG. 9B being taken in the direction 9B-9B in FIG. 9A.

DESCRIPTION OF THE PREFERRED EMBODIMENT

Figure 1:
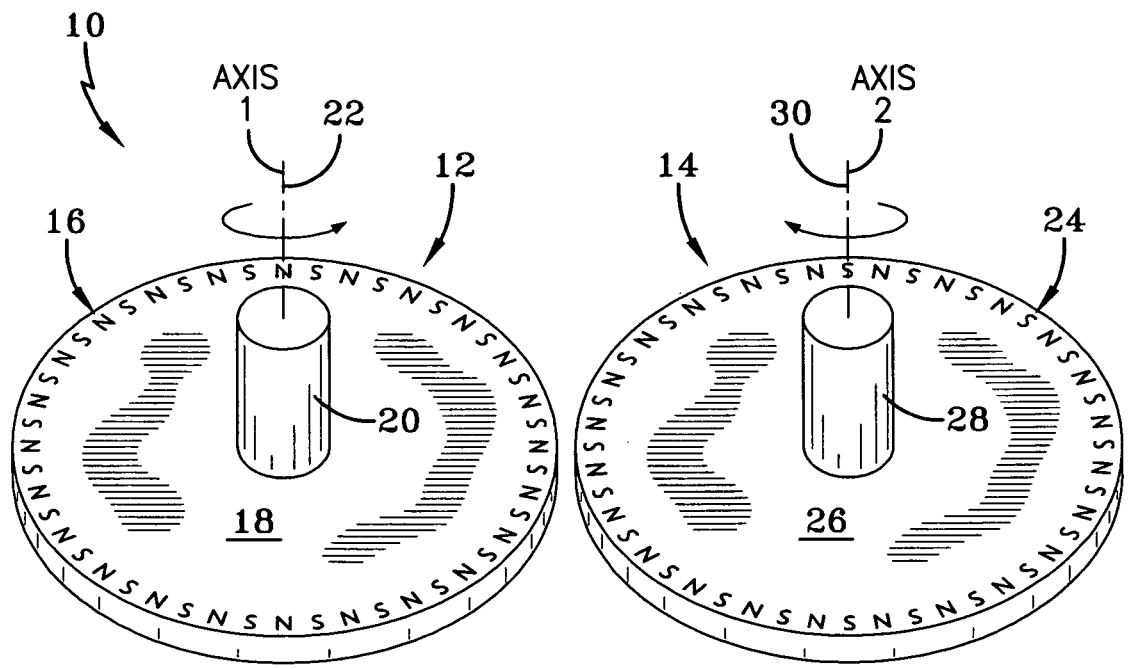
FIG. 1 is a schematic, perspective view of a preferred embodiment of the invention in its elementary form, showing driving and driven wheels.

Referring first to FIG. 1, a magnetic gear train 10 is shown (as noted earlier, magnetic wheels are being referred to as magnetic gears). Magnetic gear train 10 comprises a first magnetic gear 12 and a cooperating magnetic gear 14. Magnetic gear 12 has along its periphery a series of magnets of alternating polarity, north (N) and south (S), which are collectively identified by the numeral 16, and can constitute a series of magnets embedded in the edge of a disk 18 of which magnetic gear 12 is comprised. Magnetic gear 12 has an axle 20 and a longitudinal pivot axis 22. Magnetic gear 14 has a series of alternating magnets identified collectively by the numeral 24 embedded in a disk 26 forming part of magnetic gear 14. An axle 28 rotates magnetic gear 24 about a longitudinal axis 30. Assuming magnetic gear 12 is the driving gear, some means such as a battery powered electric motor or other external motor torque is used to rotate magnetic gear 12 counter clockwise when viewed from above gear 12 and facing gear 12. As magnetic gear 12 rotates, the close proximity of disks 18 and 26 sequentially lines up unlike-magnetic poles to effect the smooth rotation of driven magnetic gear 14 in the clockwise direction when viewed from above and facing gear 14. In the embodiment shown in FIG. 1, longitudinal axes 22 and 30 are parallel, and as long as driving magnetic gear 12 rotates as a result of an external motor torque, driven magnetic gear 14 rotates as well.

Figure 2:
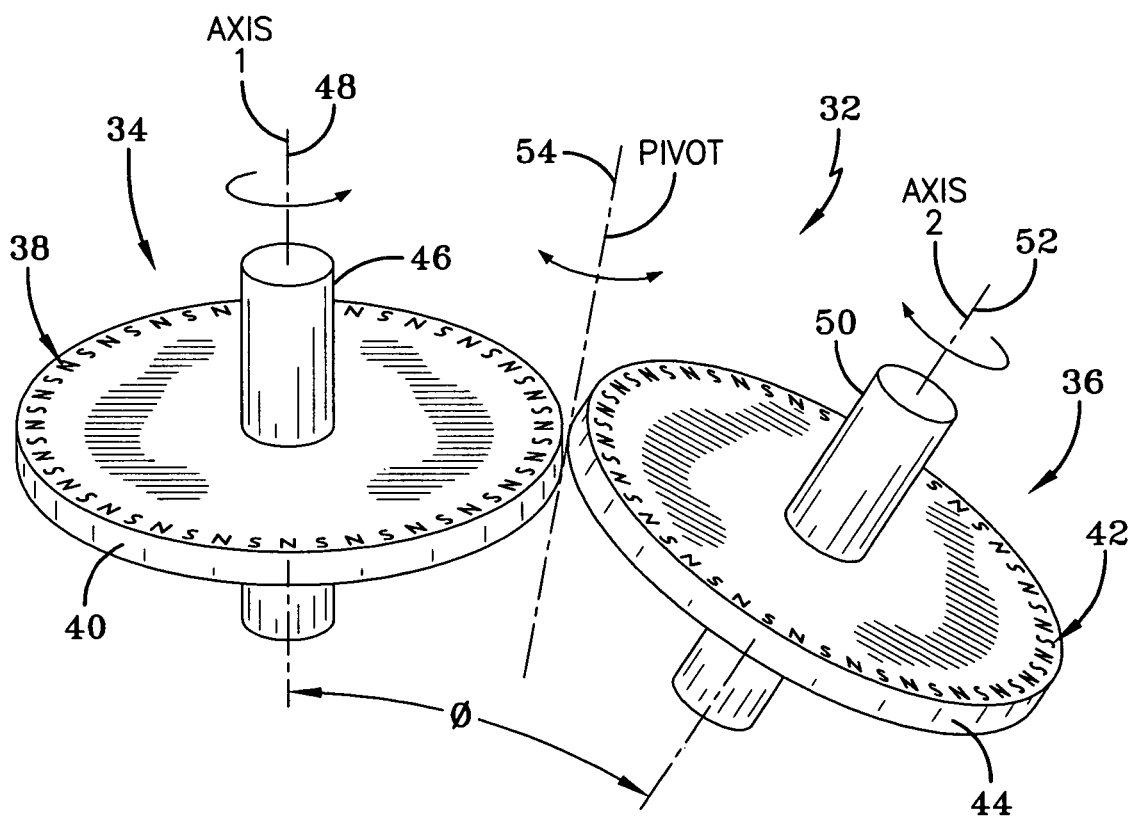
FIG. 2 is a modified version of the preferred embodiment shown in FIG. 1 in perspective form.

A similar situation is shown in FIG. 2, except that the axes of the disks are not parallel. Referring to FIG. 2, a magnetic gear train 32 is shown, having a driving magnetic gear 34 and a driven magnetic gear 36 (either gear could be the driving magnetic gear and the other the driven magnetic gear). Driving magnetic gear 34 has a series of magnets shown collectively by the numeral 38 disposed on the periphery of a disk 40 forming part of magnetic gear 34. Likewise, driven magnetic gear 36 has a series of magnets 42 which are disposed on the edge of disk 44 constituting part of magnetic gear 36. Driving magnetic gear 34 has an axle 46 which is rotatable in the counter clockwise direction when viewed from above and facing gear 34, about a longitudinal axis 48. Driven magnetic gear 36 has an axle 50 rotatable in the clockwise direction when viewed as noted immediately above, about a longitudinal axis 52. Axle 50 and longitudinal axis 52 are angled by an internal acute angle Φ. Driving gear 34 and driven gear 36 are pivotal about a common tangential pivot axis 54. Pivot axis 54 extends through the place of closest proximity of magnetic gears 34 and 36.

Figure 3:
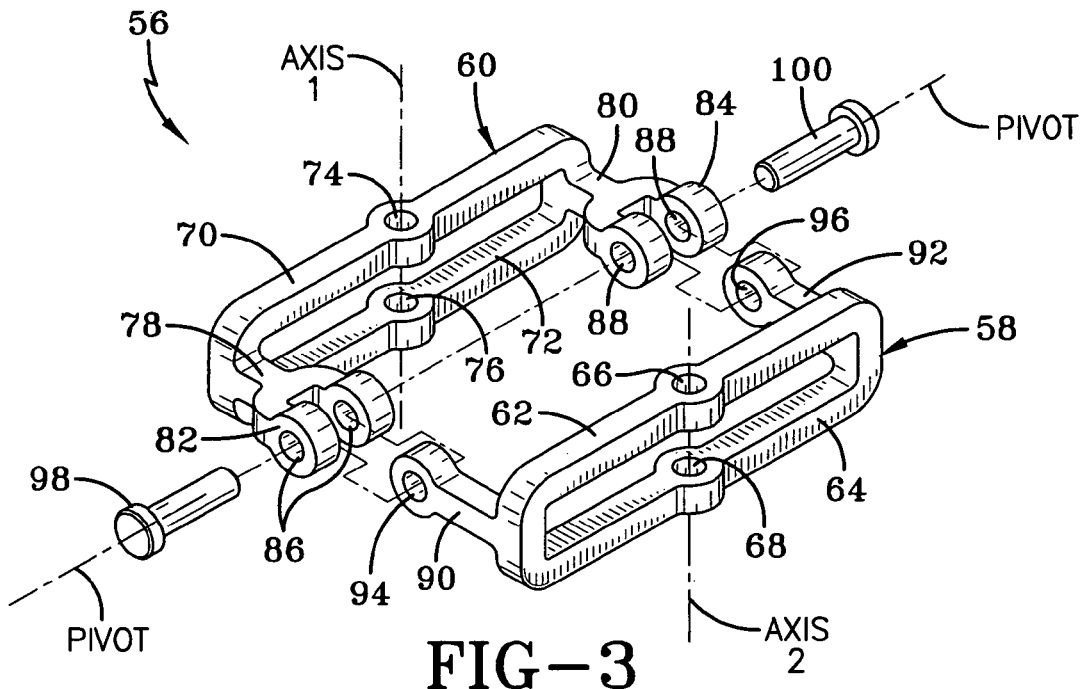
FIG. 3 shows in perspective form a schematic view of gearbox according to a preferred embodiment of the invention for incorporating the embodiment shown in FIG. 2.

A gearbox 56 for accommodating magnetic gear train 10 or 32 is shown in FIG. 3. The following description refers to gear train 32. Gearbox 56 has a first fixture 58 for housing driving magnetic gear 34, and a second fixture 60 for mounting driven magnetic gear 36 which may be of a different diameter. First fixture 58 has a pair of flanges 62 and 64 having aligned bores 66 and 68. Bores 66 and 68 receive axle 46 to maintain disk 40 in a same relative position to disk 44 as shown in FIG. 2. Second fixture 60 has a pair of opposing flanges 70 and 72 having aligned bores 74 and 76. Bores 74 and 76 receive axle 50, which may be inclined relative to axle 46 as shown in FIG. 2. Second fixture 60 further has a pair of opposing arms 78 and 80, having respective yokes 82 and 84 with aligned pairs of bores 86 and 88 for receiving between them respective arms 90 and 92 of first fixture 58. Arms 90 and 92 have aligned bores 94 and 96. Bores 94 and 96 are aligned with pairs of bores 86 and 88 when arms 90 and 92 are received in respective yokes 82 and 84. Pivot pins 98 and 100 establish a pivot corresponding to pivot axis 54 in FIG. 2.

The foregoing arrangement enables driving magnetic gear 34 to rotate under the influence of an external motor torque, to cause the rotation of magnetic gear 36 at the desired angle Φ. The foregoing is accomplished without the use of toothed gears and the shortcomings thereof. The size of respective fixtures 58 and 60 and their component parts can be altered to render gearbox 56 a reducing gearbox if driving gear 34 is larger than driven gear 36.

Figures 4, 5:
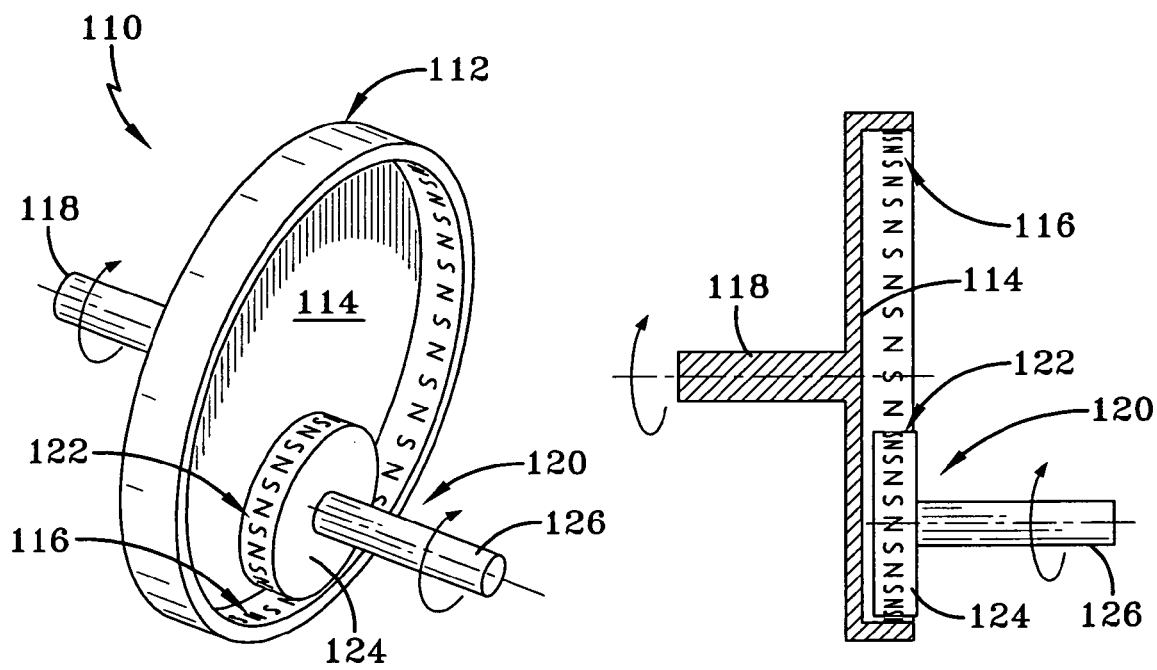
FIG. 4 shows in perspective a schematic view of another preferred embodiment of the invention showing non-contacting inner and outer magnetic wheels.
FIG. 5 is a side view of the inventions shown in FIG. 4.

FIGS. 4 and 5 show another embodiment of the invention. A magnetic gear train 110 is shown having an outer cylindrical magnetic gear 112 which is hollow but has a closed end 114, and further has a set of magnets shown collectively as numeral 116 embedded therein, adjacent ones having alternate polarities. Magnetic gear 112 further has an axle 118. Further included in gear train 110 is an internal cylindrical magnetic gear 120 having a series of alternating magnets embedded in its periphery as indicated collectively by the numeral 122 which is mounted on disk 124. A shaft 126 extends from disk 124. There is a small space separating magnets 116 of magnetic gear 112 which is at the place of closest proximity of cylindrical magnetic gears 112 and 120, and magnets 122 of magnetic gear 120. Either of magnetic gears 112 and 120 can be the driving magnetic gear, and the other (the driven magnetic gear) rotates in response to the rotation of the driving gear because of the sequential attraction of opposite poled magnets. Assuming magnetic gear 122 is the driving gear, it is shown rotating clockwise when viewed from the front facing gear 122, and magnetic gear 112 rotates in the same direction as the driven magnetic gear. For co-axial input and output shafts, an arrangement similar to a planetary type gearbox may be used. For the limiting size of magnetic gear 120 while it occupies nearly the entire inside of magnetic gear 112, the combination becomes an infinitely resettable torque limiting clutch.

Figure 6:
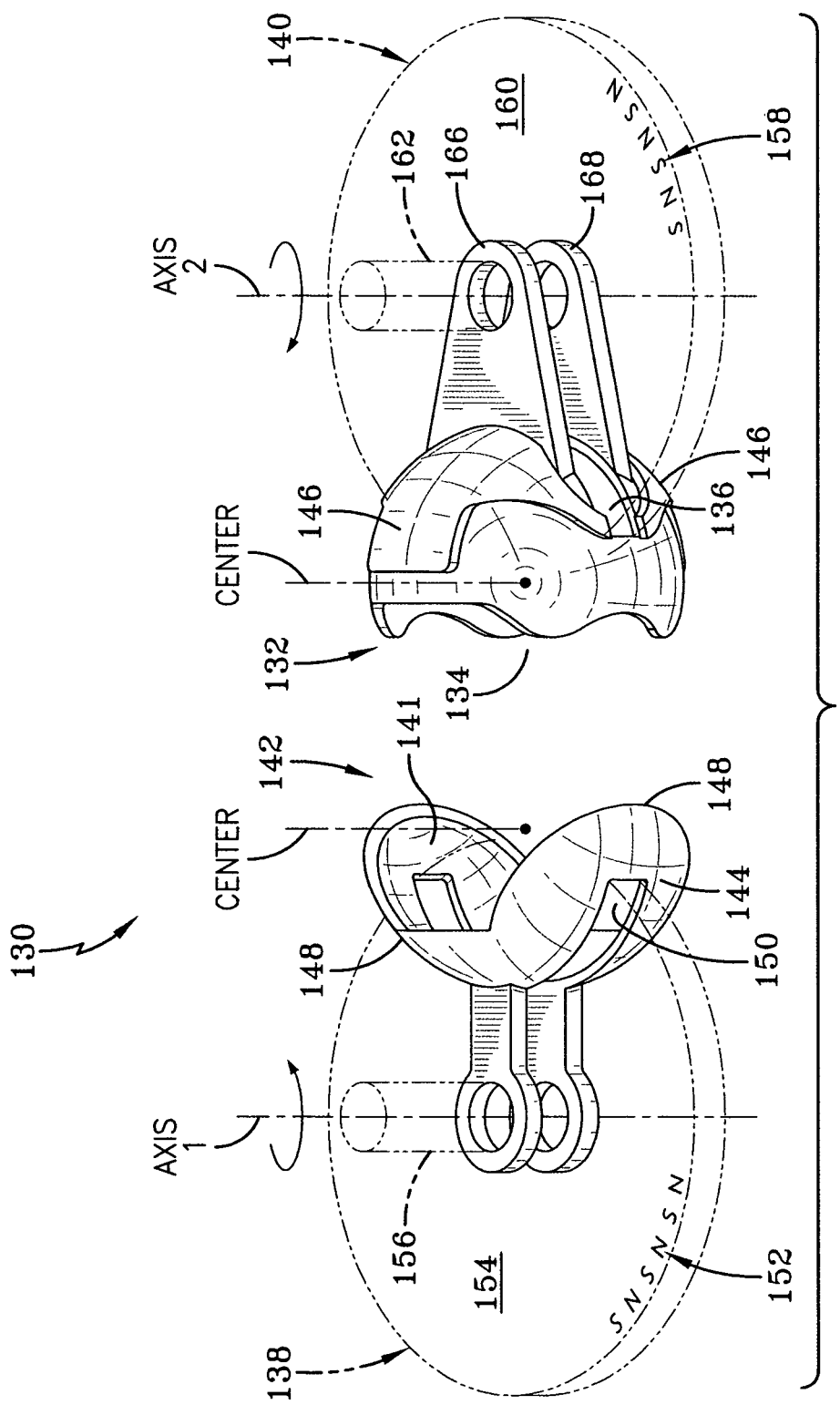
FIG. 6 is a schematic, exploded perspective view of another preferred embodiment of the invention involving a ball joint assembly.
Figure 7:
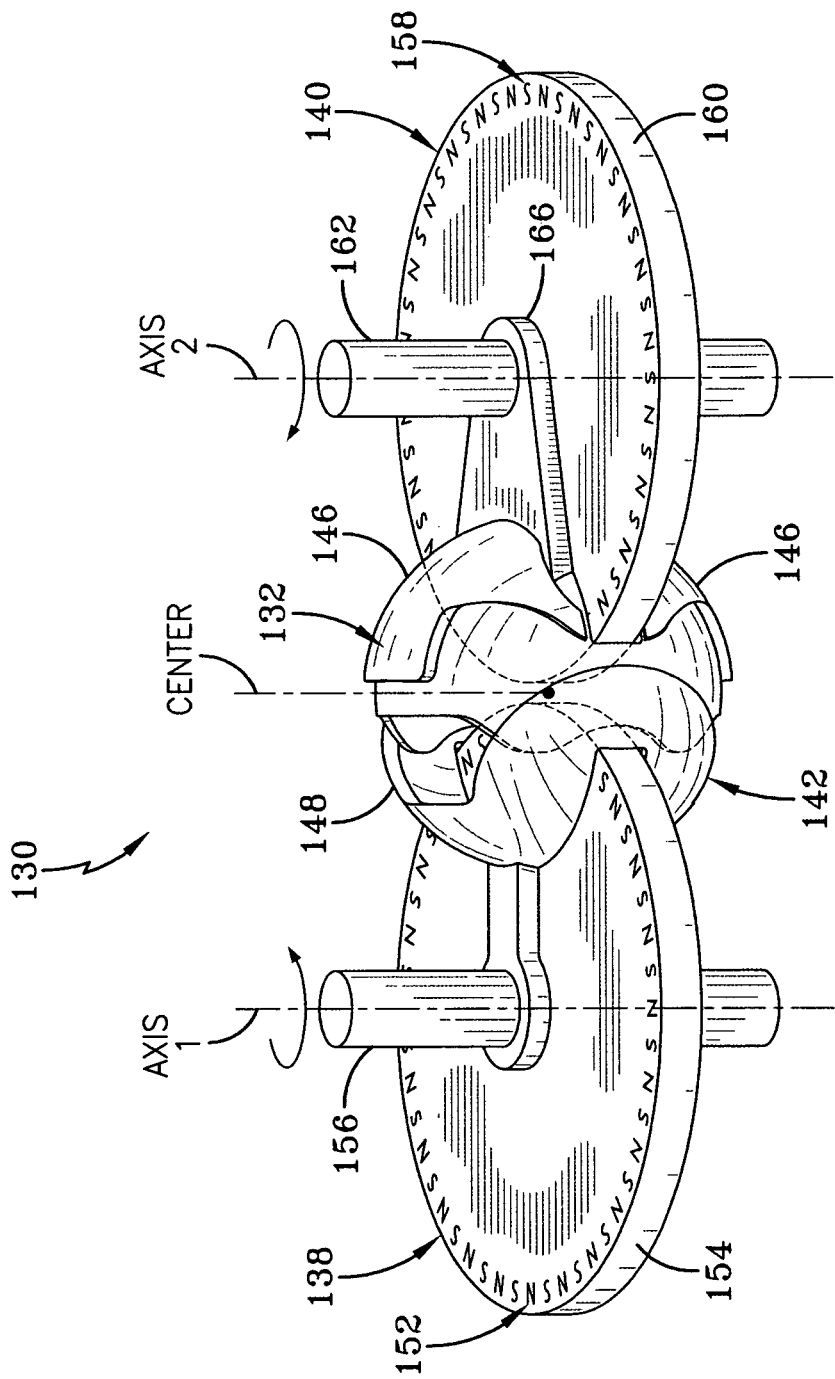
FIG. 7 is a schematic view of the embodiment shown in FIG. 6.

A ball joint assembly 130 is shown schematically in FIGS. 6 and 7. Referring first to FIG. 6, ball joint assembly 130 includes a portion of a sphere 132 made of non-magnetic material that includes a missing portion of a sector or open sector 134 and another portion of a missing-portion-of-a-sector or gear-receiving slot 136 for, as explained below, receiving a portion of magnetic gear 140. FIG. 6 includes a ball joint cap assembly 142 having a partial spherical cooperating part 144 which cooperates with raised portions 146, the latter thus partially wrapping or enclosing spherical portion sphere 132. Partial spherical cooperating part 144 of cap assembly 142 has an open-partial-spherical-portion-receiving-sector 141 which holds spherical portion 132 concentric with a small amount of clearance, and raised portions 146 limits the range of motion of spherical portion 132 within the acceptable limits of magnetic interaction between magnetic gears 138 and 140. Partial spherical cooperating part 144 includes a rounded shell portion 148 having a curved opening or driving gear-receiving slot 150 for receiving a part of magnetic gear 138. Magnetic gear 138 includes embedded in its periphery a set of magnets shown collectively by numeral 152 having alternate polarities and embedded in a disk 154. Magnetic gear 138 has an axle 156. Magnetic gear 138 extends through opening 150 and into missing portion of sector or open sector 134 of sphere 132.

Magnetic gear 140 has a set of alternating magnets shown collectively by the numeral 158 embedded around the periphery of a disk 160 from which magnetic gear 140 is formed. Magnetic gear 140 extends into slot 136 of spherical portion 132. Magnetic gear 140 has an axle 162.

Raised portions 146 of ball joint cap assembly 142 differ from the other part of cap assembly 142. Raised portions 146 are partial spherical sectors on opposite sides of a pair of parallel flanges 166 and 168 to give magnetic gear 140 access to gear-receiving slot 136 of spherical portion 132. Flanges 166 and 168 extend from spherical portion sphere 132 on opposite sides of missing-portion-of-a-sector or gear-receiving slot 136 which flanges 166, 168 have respective aligned orifices for receiving axle 162 extending from magnetic gear 140.

The operation of ball joint assembly involves the rotation of one of magnetic gears 138 or 140 by an electric motor or other motive power source (gear 138 is shown rotating counter clockwise when viewed from above facing gear 138), which causes the other magnetic gear 138 or 140 to rotate in the opposite direction as dissimilar poles of magnets 152 and 158 are opposite each other in polarity and interact magnetically attractively. Those magnetically interacting magnets are proximate to the location where respective individual magnets of sets of magnets 152 and 158 are closest to each other, marked by the point or dot labelled "CENTER" in FIG. 7. Ball joint assembly 130 is advantageous in that axles 156 and 162 can be tilted relative to each other as sphere 132 tilts, but axles 156 and 162 cannot be perpendicular to each other since the rotation would not be possible, and the limitation on the relative tilting and relative rotation of axles 156 and 162 is accomplished by the abutment of the end of one of raised portions 146 and the surface of rounded shell portion 148. Thus, tops of axles 156 and 162 can be tilted towards or away from each other, and they can also rotate to some extent about axes perpendicular to the respective axles 156 and 162. In other words, inherently torque limiting magnetically coupled wheels or gears 138 and 140 may be used in a manner similar to gears in mesh such that a rotation of one of the magnetic wheels or gears 138 or 140 produces a corresponding rotation of the other wheel or gears 138 and 140 without any physical contact between them. This permits complete continuous shaft rotation when axles 156 and 162 are parallel, and axles 156 and 162 can be shifted angularly and continue to rotate unlike classical gears with solid teeth.

Figure 8A:
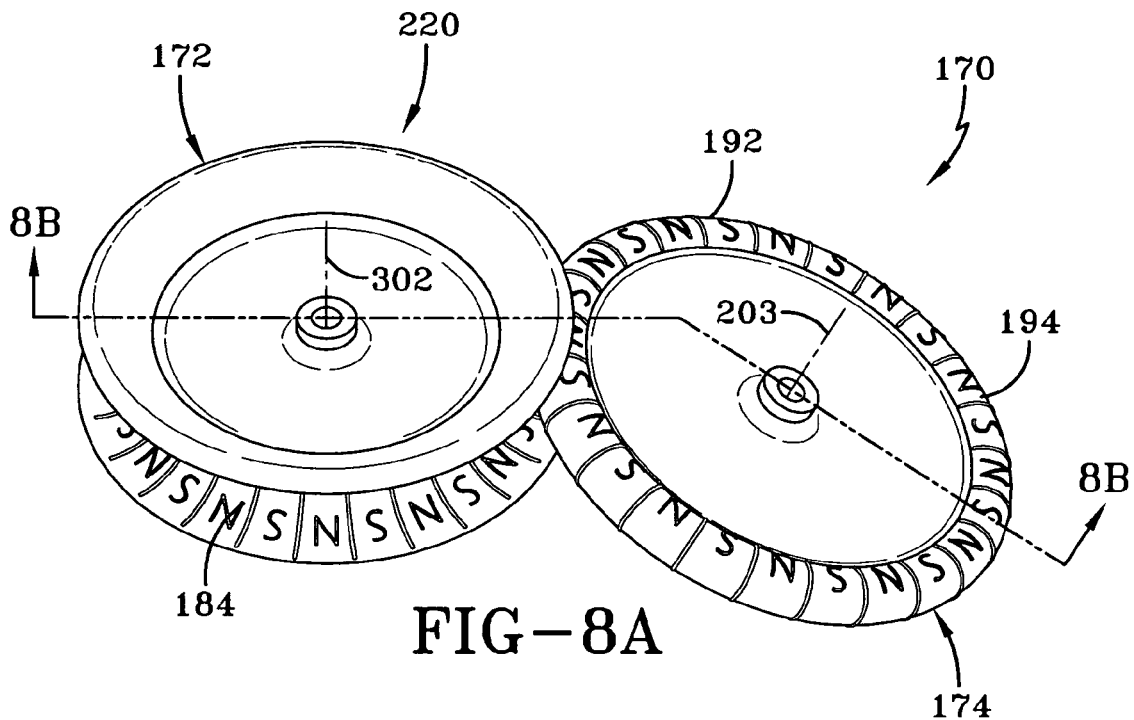
FIGS. 8A and 8B are schematic views of a gear train according to another preferred embodiment of the invention, with FIG. 8A being a perspective view and FIG. 8B being taken in the direction 8B-8B in FIG. 8A.
Figure 8B:
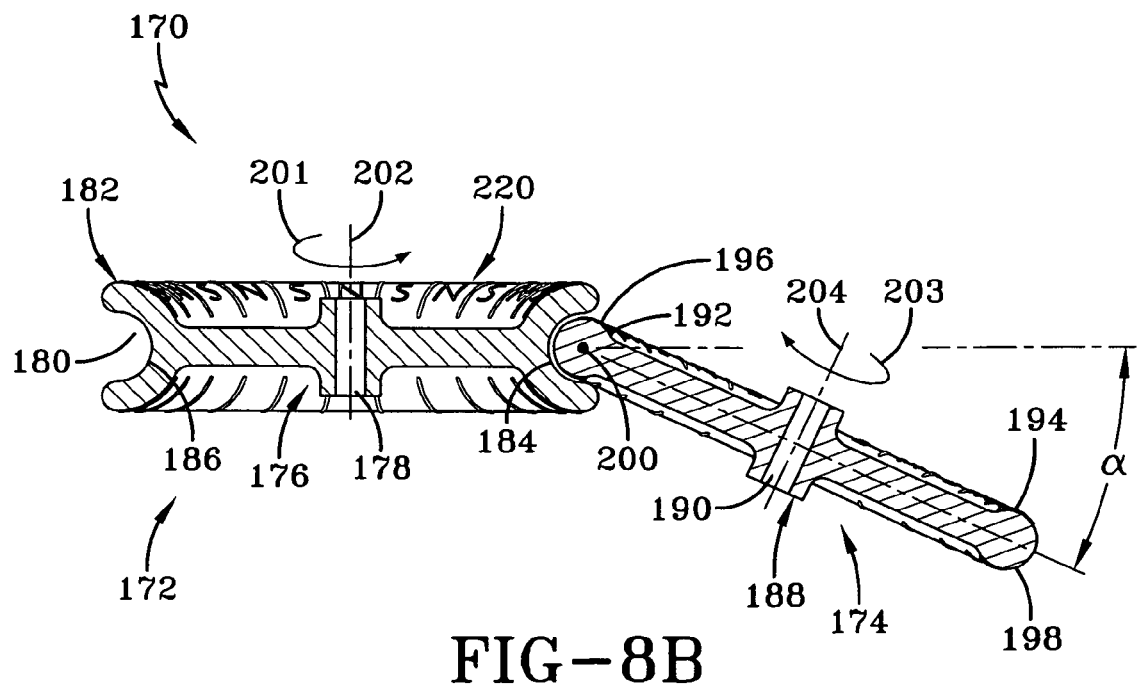

Referring next to FIGS. 8A and 8B, a gearbox 170 in schematic form is shown. Gearbox 170 includes a first magnetic gear 172 and a second magnetic gear 174. Magnetic gear 172 includes a shaft receiving portion 176 having a bore 178 for holding a shaft for rotating magnetic gear 172 or being rotated with magnetic gear 174 (depending on whether the latter is the driving or the driven gear). The outer edge of magnetic gear 172 has a circumferential depression 180 with magnets of alternating polarity (N, S, N, S, N, S . . . ) as indicated by respective numerals 184 and 186, embedded therein.

Magnetic gear 174 has a shaft receiving portion 188 with a bore 190 for receiving a shaft which is rotatable within (or rotatable with) magnetic gear 174. Magnetic gear 174 includes an approximately toroidal ring 192 of magnetic material with short, adjacent segments 194 of said ring 192 having alternate magnetic polarities. Adjacent magnetic segments 194 with opposing polarities are adjacent to but not contacting circumferential depression 180 at the location where a part of toroidal ring 192 is within depression 180 at a pivot point 200, and about which magnetic gear 174 is pivotable or tiltable; magnetic gear 174 can rotate clockwise as shown by the arrow 203 about its longitudinal axis 204 (when viewed from above) in response to the rotation of magnetic gear 172 rotating counter clockwise as shown by the arrow 201 about its longitudinal axis 202 (when viewed from above), with magnetic gear 174 being inclined from magnetic gear 172 by a variable angle $\alpha$. Magnetic gear 174 has a shaft that can rotate clockwise about longitudinal axis 204, and as noted angle $\alpha$ can vary while the respective rotations are taking place.

Figure 10:
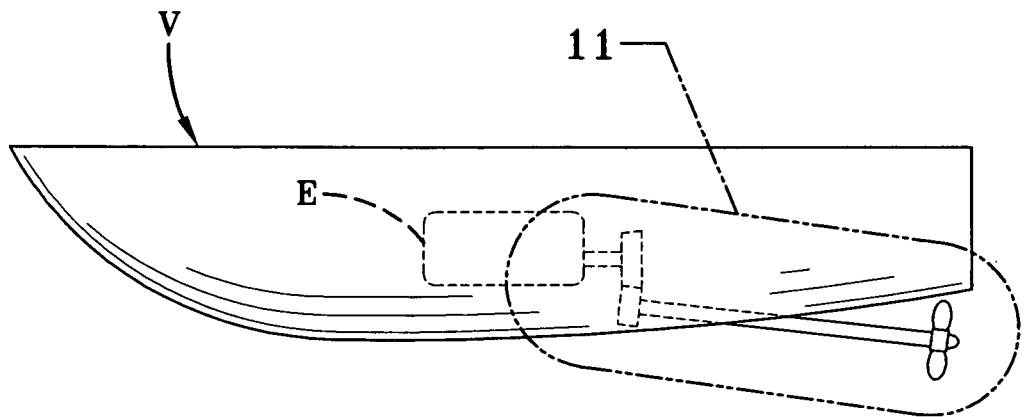
FIG. 10 shows a preferred embodiment of the invention for use in a maritime environment for driving the propeller of a water vessel.
Figure 11:
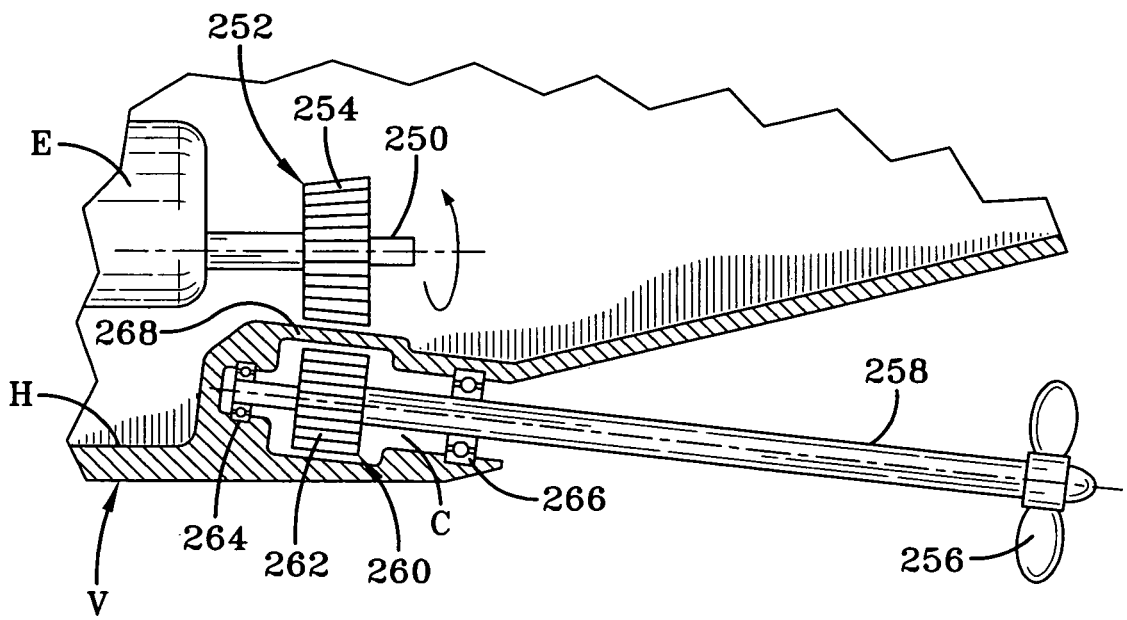
FIG. 11 is a detailed, schematic cross sectional view of the embodiment shown in FIG. 10.

FIGS. 9A and 9B show a gear train 210. Gear train 210 includes a driving (or driven) magnetic gear 212 and a driven (or driving) magnetic gear 214. Driving magnetic gear 212 rotates, under the influence of an external motor torque, in the clockwise direction shown by an arrow 213 when viewed from above facing magnetic gear 212 about a longitudinal axis 218. Driving magnetic gear 212 includes a shaft receiving portion 215 having a bore 216, and a non-circular toroidal ring 217 at the edge of driving magnetic gear 212. Gear 214 rotates in the opposite direction from gear 212. Ring 217 has embedded therein a series of magnets identified respectively and collectively by numeral 220, which respective adjacent magnets are of opposite polarity. A hinge whose axis 224 is tangent to both magnetic gears 212 and 214 in a gearbox housing is shown. Driven magnetic gear 214 includes a toroidal ring 230 having a depression 232 with a partial cylindrical part 231. Toroidal ring 230 has on the portion surrounding depression 232 a set of embedded magnets shown collectively as numeral 234, adjacent magnets being of opposite polarity and being spaced from magnets 220 on ring 217. A shaft receiving portion 228 has a longitudinal axis 240 about which a shaft extending through a bore 229 is rotatable counterclockwise as shown by an arrow 233 when viewed from the right. Magnetic gear 212 is disposed in part in depression 232 of magnetic gear 214, and a point of closest proximity 239 occurs as shown in FIGS. 9A and 9B, where rotation of driving magnetic gear 212 (or 214) effects rotation of the driven magnetic gear 214 (or 212) in the opposite direction. Axis 240 of driven magnetic gear 214 is rotatable through variable angle $\theta$ which may slightly exceed 90° below the plane of magnetic gear 214 and as much as 45° above said plane for enabling the rotation of the shaft extending through bore 229 while said axis 240 is being rotated with respect to magnetic gear 212, as shown by arrows 233 in FIGS. 9A and 9B The incorporation of a reduction gear train in a water vessel or watercraft is shown in FIGS. 10 and 11. These illustrations show a vessel V having an engine E. Vessel V has a hull H. Vessel V includes a gear and shaft cavity C for holding a magnetic gear and propeller shaft as discussed below. Extending from engine E is a drive shaft 250 on which is mounted a magnetic gear 252. Magnetic gear 252 has on its surface a series of magnets embedded therein identified collectively by the numeral 254, adjacent magnets having opposite polarity. Magnetic gear 252 is rotatable as shown in the counterclockwise direction when viewed from the right facing gear 252, with the rotation of drive shaft 250. A propeller 256 is mounted on a driven shaft 258, and mounted on driven shaft 258 is a magnetic gear 260 having on its surface embedded therein a series of magnets identified collectively by the numeral 262. Adjacent magnets 262 have opposite polarity. Shaft 258 is supported for rotation (in the opposite direction from shaft 250) by bearings 264 and 266. These bearings 264 and 266 may alternatively be a magnetic type. Magnetic gears 252 and 260 are adjacent but spaced from each other and separated by a preferably non-conductive and non-magnetic hull portion 268. The rotation of magnetic gear 252 mounted on drive shaft 250 effects the rotation of magnetic gear 260 even though they are separated by the hull portion 268. This arrangement has very significant advantages. First, since no water or other deleterious material will be able to either contact magnetic gear 252, drive shaft 250 or engine E; this arrangement would have a long life and significant economic advantages over present systems since no hole need be provided in the hull for receiving a drive shaft, and likewise there need not be required a stuffing box or some other equipment for preventing sea or other ambient water from passing through the hull. Furthermore, this arrangement would be much simpler to install, since no work need be done with the vessel V at all in order to accommodate the foregoing magnetic gear arrangement. All of the problems associated with leakage into the vessel would be avoided. In fact, the external portion of the propulsion system could be composed of easily demountable modules clamped or otherwise fastened to the exterior of hull portion 268. As a variation, shaft 258, magnets 262 and propeller 256 could be part of a demountable pod for enabling easy replacement of the entire pod 269 inclusive of shaft 258, magnets 262 and propeller 256.

Figure 13:
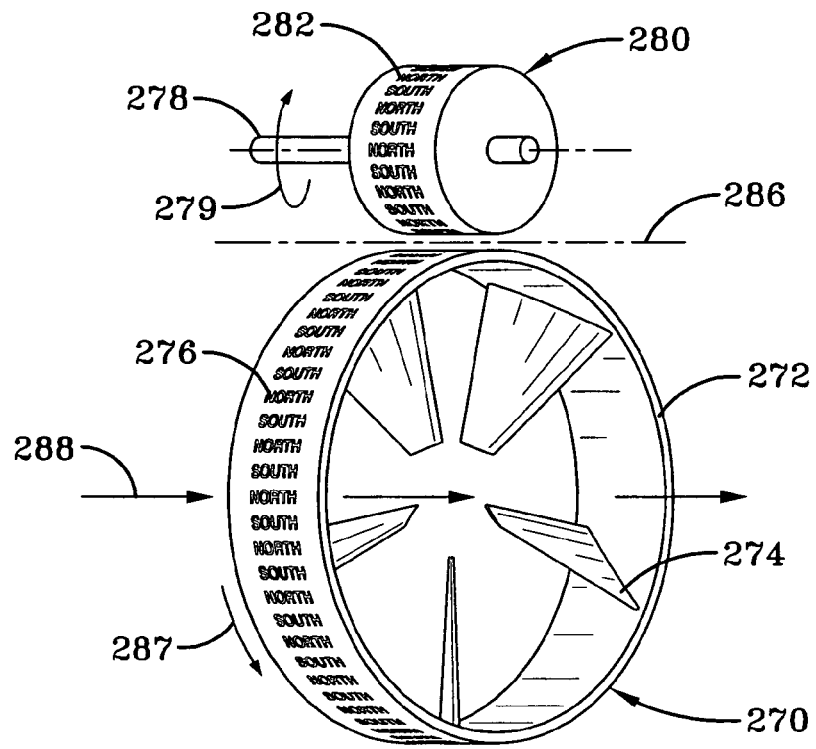
FIG. 13 is a schematic, perspective view of one version of the embodiment shown in FIG. 12.
Figures 12, 14:
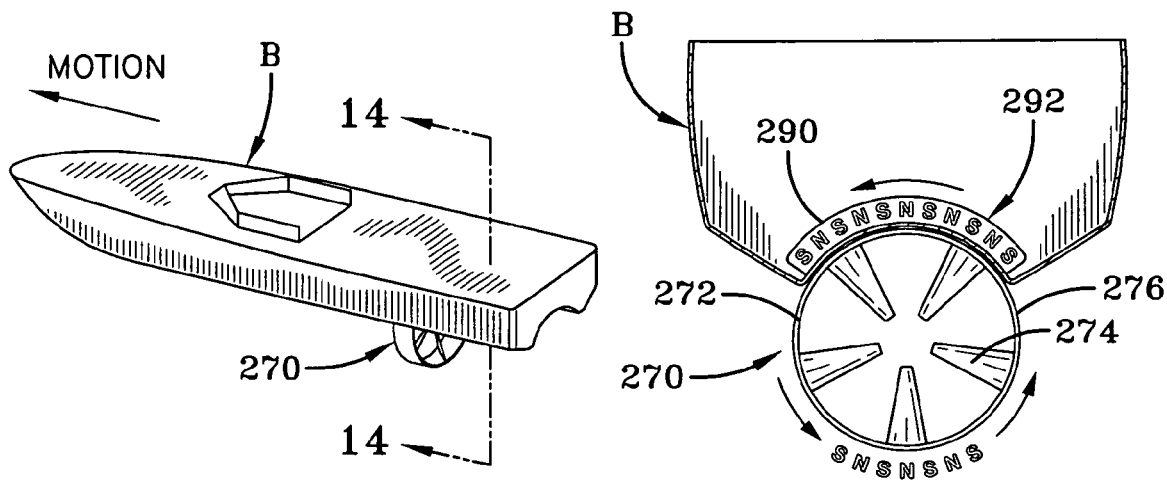
FIG. 12 is a schematic view of the invention in a further preferred embodiment for rotating a propeller blade assembly having blades extending internally from an outer housing.
FIG. 14 is a schematic view of another version of the embodiment shown in FIG. 12.

Another maritime uses of the present invention is shown in FIGS. 12, 13 and 14. FIG. 12 shows a boat B having a propeller drive assembly 270. Referring to FIGS. 13 and 14, propeller drive assembly 270 has an outer housing 272 from which extend radially inwardly, a set of propeller vanes 274. Outer housing 272 is a magnetic gear and has embedded across its outer surface a set of magnets embedded therein, identified collectively by the numeral 276 of which adjacent magnets are of opposite polarity. Turning specifically to FIG. 13, boat B has an engine shaft 278 which is shown by an arrow 279 as being rotatable in the clockwise direction when viewed from a magnetic gear 280 mounted on shaft 278. Magnetic gear 280 can have a cylindrical or conical outer periphery in which are embedded a series of magnets identified collectively by numeral 282, and adjacent magnets 282 are of opposite polarity. A preferably non-conductive and non-magnetic hull 286 separate magnetic gear 280 from the power drive assembly 270. Magnetic gear 280 is a driven drum. Engine shaft 278 rotates magnetic gear 280, which in turn rotates propeller drum assembly 270 counter clockwise when viewed from the left as shown by arrow 287 by virtue of the sequential of alignment of magnets of like polarity on outer housing 272 and magnetic gear 280. Water flows in the direction shown by arrows 288. Bearings are provided to prevent axial or radical motion with respect to the hull and may be achieved by hydrodynamic, magnetic or mechanical means.

Magnets 282 of magnetic gear 280 sequentially enter a first location on one side of hull 286 which is spaced from and adjacent to a second location on the other side of hull 286, the first and second locations being in the magnetic fields of magnets 282 and 276 and such adjacent magnetics whose magnets flux physically effects the other magnetic gear, in the respective locations. Magnets 282 in the first location having the opposite polarity as a magnet 276 in the second location cumulatively effect the rotation of propeller drive housing 270 as the magnets move through the respective first and second location. That is, the latter magnets have appreciable physical effect on the other magnetic gear.

In an alternate arrangement shown in FIG. 14, the same propeller drive assembly 270 is used in the embodiment shown in FIG. 13, but a curved linear induction motor 290 establishes a series of alternating polarities travelling about the center of rotation of drive assembly 270 indicated by the numeral 292 which sequentially line up through preferably non-conductive and non-magnetic hull 286 with magnets 276 of unlike polarity, to effect the rotation of outer housing 272. The same advantages would apply in this embodiment as in the embodiment shown in FIG. 12, since there is no need to pierce the hull or boat B.

A propeller drive assembly 270 driven from inside hull portion 286 could also possibly have hydrodynamic or magnetic support bearings in order to further eliminate frictional energy losses. Although a propulsion system for a waterborne vessel or watercraft has been described here, this system may be advantageously applied to propel aircraft or other craft through other fluids. If it could be made sufficiently light and stiff.

Figure 15A:
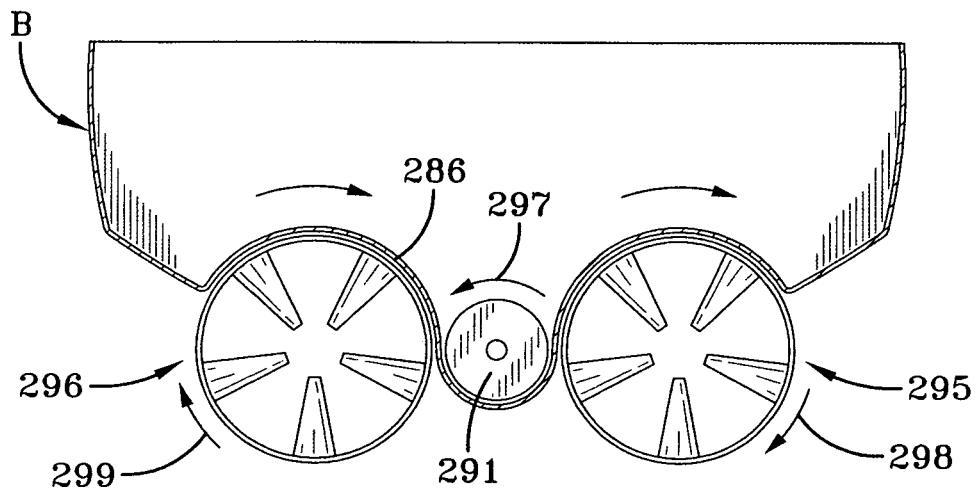
FIG. 15A is a schematic view of another preferred embodiment having a magnetic gear for driving a pair of magnetic propeller drive assemblies.
Figure 15B:
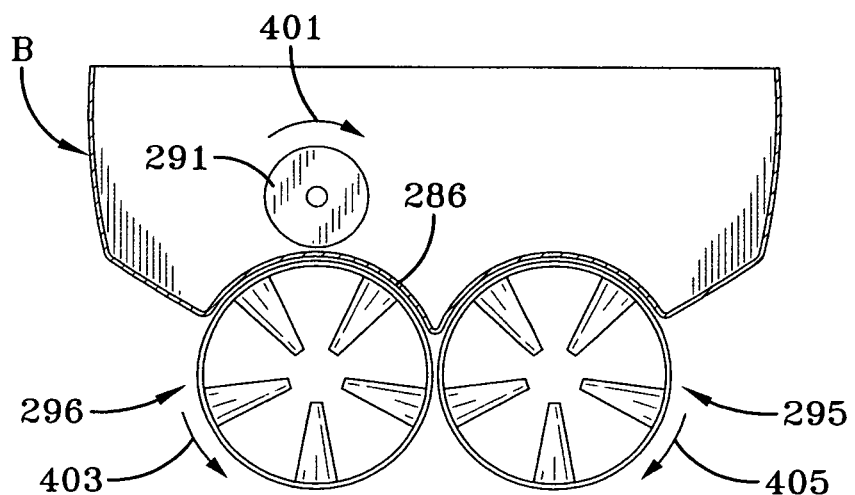
FIG. 15B shows a variation on the embodiment shown in FIG. 15A.

FIGS. 15A and 15B show arrangements similar to that of FIG. 13. A magnetic gear 291 rotated by an electric motor or the like is on one side of preferably non-conductive and non-magnetic hull 286, and a pair of propeller drive assemblies 295 and 296, which are all constructed as is propeller drive assembly 270, and reference is made to the description of assembly 270 and to magnetic gear 280 for explanation of the apparatus shown in FIGS. 15A and 15B. Magnetic gear 291 is shown rotating in the counter clockwise direction indicated by an arrow 297, which effects the rotation of drive assemblies 295 and 296 in the clockwise direction shown by arrows 298 and 299. FIG. 15B shows a variation where a magnetic gear 294 effects the rotation of propeller drive assembly 296 which in turn rotates drive assembly 295 in the opposite direction. Magnetic gear 294 is shown rotating clockwise by arrow 401 causing propeller drive assembly 296 to rotate counter clockwise as shown by arrow 403, which causes propeller drive assembly 295 to rotate clockwise. The magnetic segments are not shown for each of magnetic gear 291 and propeller drive assemblies 295 and 296, but they are included in each of these components.

Figure 16:
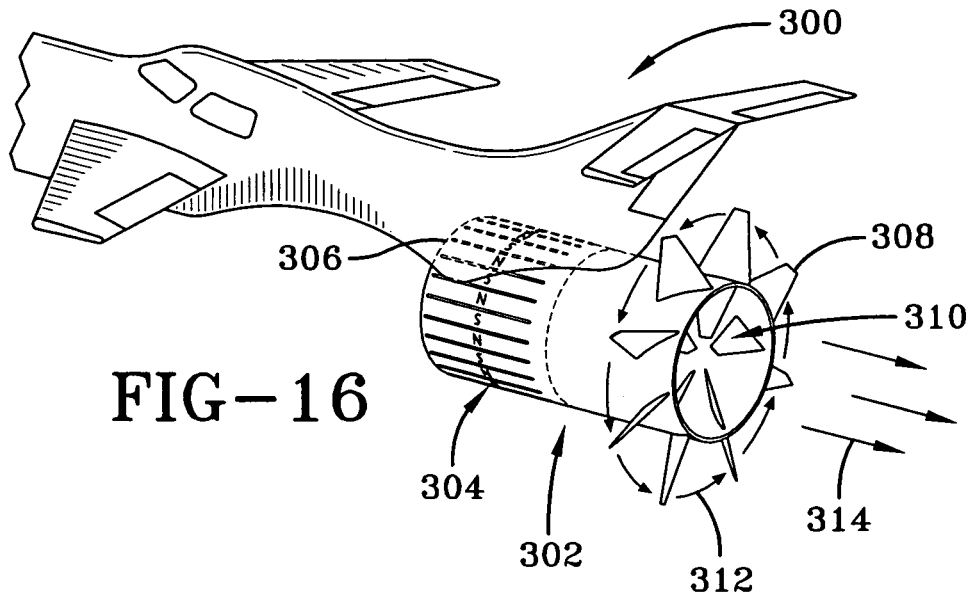
FIG. 16 is a schematic perspective view of an aircraft having a propeller drive assembly according to another preferred embodiment of the invention.
Figure 17:
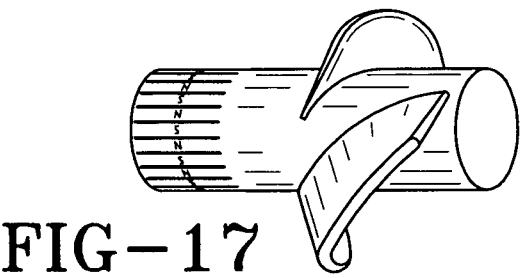
FIG. 17 is a variation on a portion of the propeller drive assembly shown in FIG. 16.

The inventive concept has numerous other applications. It can for example be used in aircraft. Referring to FIG. 16, an aircraft 300 is shown. Aircraft 300 has a propeller support housing 302 having on one portion a set of alternating polarity magnetic segments 304. Support housing 302 is mounted for rotation about a set of appropriate radial and thrust bearings 306. Extending from the aft part of support housing 302 is a set of external propeller blades 308 and internal propeller blades 310. Aircraft 300 has either an electrical induction drive or other electrical structure for sequentially lining up like magnetic poles with like magnetic poles of magnetic segments 304 to cause support housing 302 to rotate. An arrow 312 shows that support housing 302 is rotating in the counter clockwise direction, and a set of arrows 314 shows the air-flow moving tailward. Support housing 302 could be replaced by an appropriate support auger air screw 216 shown in FIG. 17 having appropriate external blades 318 mounted spirally on a body 320 of air screw 316.

Figure 18:
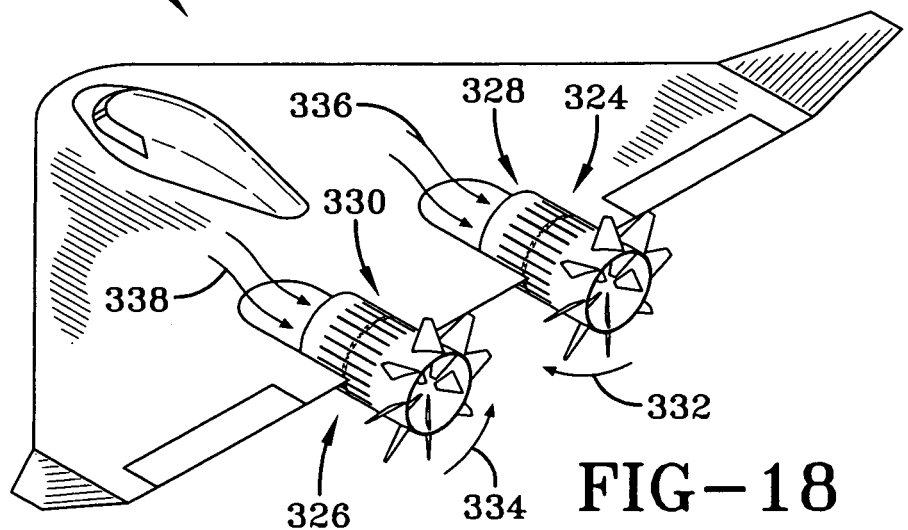
FIG. 18 is a variation on the embodiment shown in FIG. 16.

A plurality of alternating magnetic propulsion systems for aircraft is also possible. A delta flying wing aircraft 318 is shown in FIG. 18. A pair of propeller support housing 324 and 326, like propeller support housing 302, is provided at the tail end of aircraft 318. Support housing 324 and 326 respectively have alternating magnetic polarity segments 328 and 330 which are electrically driven in a rotational movement by an appropriate electrical driving system in aircraft 318. This is shown as effecting the clockwise rotation of support housing 324 shown by arrow 332 and the counterclockwise rotation of support housing 326 indicated by arrow 334. Airflow is shown by sets of arrows 336 and 338, and could beneficially be used to ingest/remove turbulent air from above the wing and increasing its lifting capability.

The transport aspects of the present invention are clean, and if electrically driven, do not us petroleum or other solid or liquid fuel and do no harm the environment. There is expected to be low frictional wear and tear on the system as compared to those systems presently in use.

Many of the magnetic components described herein are permanent magnets. In some instances, electro-magnets will be used as well.

The invention has been described in detail, with particular to reference to the preferred embodiments thereof, but variations and modifications within the spirit and scope of the invention may appear to those skilled in the art to which the invention pertains.

The invention claimed is:

1. A magnetic gear train comprising:
a driving gear having a driving gear longitudinal axis, a driving gear periphery and a set of magnets embedded in said driving gear periphery, said set of magnets having alternate polarities;
a driving gear axle attached to said driving gear and extending along said driving gear longitudinal axis;
a driven gear having a driven gear longitudinal axis, a driven gear periphery and a set of magnets embedded in said periphery, said set of magnets having alternate polarities;
a driven gear axle attached to said driven gear and extending along said driven gear longitudinal axis;
said driving gear and said driven gear being located for enabling the rotation of said driven gear and said driven gear axle in one direction due to the sequential magnetic interaction of said magnets embedded in said driving gear periphery and the magnets embedded in the driven gear periphery in response to a driving force being applied to said driving axle for rotating said driving gear in the opposite direction of rotation; and
wherein when both said driving gear axle and said driven gear axle are parallel with each other and said driving gear and said driven gear are coplanar, forming a coplanar position, so that the driving gear and driven gear respective driving gear and driven gear peripheries are parallel, a pivot axis is located at the midpoint of the axial thickness of the driven gear and driving gear and a midpoint of the distance between the driven gear and driving gear where the magnets of the driven gear and driving gear are closest to each other;
said driven gear and said driven gear axle being tiltable with respect to said driving gear and said driving gear axle at said pivot axis with said driven gear assuming a tilting angle with respect to said coplanar position,
wherein said driven gear axle has one axial end tilted away from one axial end of said driving gear axle and another axial end tilted toward another axial end of said driving gear axle, when said driven gear is at said tilting angle with respect to said coplanar position, and
wherein the tilting angle must be significantly less than 90° to prevent loss of sequential magnetic interaction.

2. A magnetic gear train comprising: a driving gear having a driving gear longitudinal axis, a driving gear periphery and a set of magnets embedded in said driving gear periphery, said set of magnets presenting alternate polarities at the surface of said driving gear;
a driving gear axle attached to said driving gear and extending along said driving gear longitudinal axis;
a driven gear having an and a driven gear longitudinal axis, a driven gear periphery and a set of magnets embedded in said periphery, said set of magnets presenting alternate polarities at the surface of said driven gear;
a driven gear axle attached to said driven gear and extending along said driven gear longitudinal axis;
said driving gear and said driven gear having a coplanar position and non-coplanar positions, and being located for enabling the rotation of said driven gear and said driven gear axis in one direction due to the magnetic interaction of said magnets embedded in said driving gear periphery and the magnets embedded in the driven gear periphery in response to a driving torque being applied to said driving gear axle, for rotating said driving gear in the opposite direction of rotation from the direction of rotation of said driving gear; and
said driving gear and said driving gear axle being tiltable with respect to said driven gear and said driven gear axle between the coplanar position when both said driving gear axle and said driven gear axle are parallel with each other and said driving gear and said driven gear are coplanar, and one of the non-coplanar positions wherein the angle between the coplanar position and one of said driving gear and said driven gear maintains magnetic interaction of said set of magnets embedded in said driving gear periphery and said set of magnets embedded in said driven gear periphery;
wherein one of said driving gear and said driven gear has a circumferential depression with a peripheral concavity curved surface when viewed in cross-section with one of said sets of magnets embedded in said peripheral concavity, and the other of said driving gear and said driven gear having a circumferential toroidal ring having a toroidal ring curved surface with the other said sets of magnets embedded in said toroidal ring curved surface, said other of said sets of magnets presenting alternate polarities to the polarities of said set of magnets embedded the other of said driving gear and said driven gear, said peripheral concavity curved surface matching the toroidal ring curved surface, a part of said toroidal ring being located in but not contacting said circumferential depression so that the curved surface of said peripheral concavity moves along the curved surface of said toroidal ring about a pivot axis when said driving gear is tilted with respect to said driven gear between the coplanar position and the non-coplanar positions.

3. The magnetic gear train assembly according to claim 2 wherein:
said driven gear is tiltable relative to said driving gear for changing the position of said driving gear longitudinal axis and said driven gear longitudinal axis in an angular range between a first tilting angle wherein said driving gear longitudinal axis and said driven gear longitudinal axis are parallel and alternative second tilting angles in each of opposite directions from said first tilting angle, wherein the second tilting angles are either above or below the coplanar position while both gear axes are non-parallel and is only limited in either direction by the physical interaction of said driven gear and said driving gear.

4. A magnetic gear train comprising: a driving gear having a driving gear longitudinal axis, a driving gear periphery and a set of magnets embedded in said driving gear periphery, said set of magnets presenting alternate polarities at the surface of said driving gear;
a driving gear axle attached to said driving gear and extending along said driving gear longitudinal axis;
a driven gear having a driven gear longitudinal axis, a driven gear periphery and a set of magnets embedded in said driven gear periphery, said set of magnets presenting alternate polarities at the surface of said driven gear;
a driven gear axle attached to said driven gear and extending along said driven gear longitudinal axis
when both said driving gear axle and said driven gear axle are parallel with each other and said driving gear and said driven gear are coplanar so that the driving gear and driven gear respective driving gear and driven gear peripheries are parallel, a pivot axis is located at the midpoint of the axial thickness of the driven gear and driving gear and a midpoint of the distance between the driven gear and driving gear where the magnets of the driven gear and driving gear are closest to each other; and
a magnetic gear holding apparatus comprising:
a ball joint cap assembly including:
a rounded shell portion made of non-magnetic material attached to the driving gear axle by a pair of flanges extending from the rounded shell portion, said rounded shell portion including an open-partial-spherical-portion-receiving-sector and a driving gear-receiving slot for receiving a portion of said driving gear; and
a spherical portion being configured for being partially and concentrically received by said rounded shell portion with an amount of clearance, attached to the driven gear axle by a pair of flanges extending from the spherical portion, said spherical portion having an open sector for receiving a portion of said driving gear, and raised portions attached to said spherical portion and being in the path of said rounded shell portion upon relative movement of said spherical portion and said rounded shell portion for limiting movement of said spherical portion by blocking movement of said spherical portion to maintain acceptable limits of magnetic interaction between said driving gear and said driven gear; said spherical portion having a driven gear-receiving slot for receiving a portion of said driven gear;
said driving gear-receiving slot in said rounded shell portion and said driven-gear receiving slot in said spherical portion maintaining the pivot axis of said driving gear and said driven gear; and
said rounded shell portion and said spherical portion being rotatable relative to each other within said predetermined acceptable limits of magnetic interaction to enable the relative tilting of said driving gear and said driven gear at the pivot axis of said driving gear and said driven gear.

5. A magnetic gear train comprising:
a driving gear lying in an imaginary driving gear plane, a driving gear longitudinal axis, a driving gear periphery and a set of magnets embedded in said driving gear periphery, said set of magnets having magnet poles of alternate polarities;
a driving gear axle attached to said driving gear and extending along said driving gear longitudinal axis;
a driven gear lying in an imaginary driven gear plane, a driven gear longitudinal axis, a driven gear periphery and a set of magnets embedded in said periphery, said set of magnets having magnetic poles of alternate polarities;
a driven gear axle attached to said driven gear and extending along said driven gear longitudinal axis;
a magnetic gear holding and tilting apparatus comprising a ball joint assembly, said ball joint assembly comprising:
a rotatable spherical portion made of non-magnetic material having a driven gear slot for receiving a portion of said driven gear and fitted to the driven gear axle by a pair of bearing flanges extending from the rotatable spherical portions;
a rounded shell portion made of non-magnetic material, attached to the driving gear axle by a pair of bearing flanges extending from the rounded shell portion, said rounded shell portion including an open-partial-spherical-portion-receiving-sector for receiving said rotatable spherical portion and a driving gear receiving slot for receiving a portion of said driving gear;
when both said driving gear axle and said driven gear axle are parallel with each other and said driving gear and said driven gear are coplanar so that the driving gear and driven gear respective driving gear and driven gear peripheries are parallel, a pivot axis is located at the midpoint of the axial thickness of the driven gear and driving gear and a midpoint of the distance between the driven gear and driving gear where the magnets of the driven gear and driving gear are closest to each other;
said driven gear and said driving gear being arranged in said respective slots such that said driven gear and said driving gear are closest to each other and the pivot axis is within said open-partial-spherical-portion-receiving-sector gear; and
range-limiting portions for limiting the range of rotation of said rotatable spherical portion within the acceptable limits of magnetic linkage between magnets of the opposite polarity of said driving gear and said driven gear and physical interference for enabling rotation of said driven gear relative to said driving gear.

\* \* \* \* \*